United States Patent Office

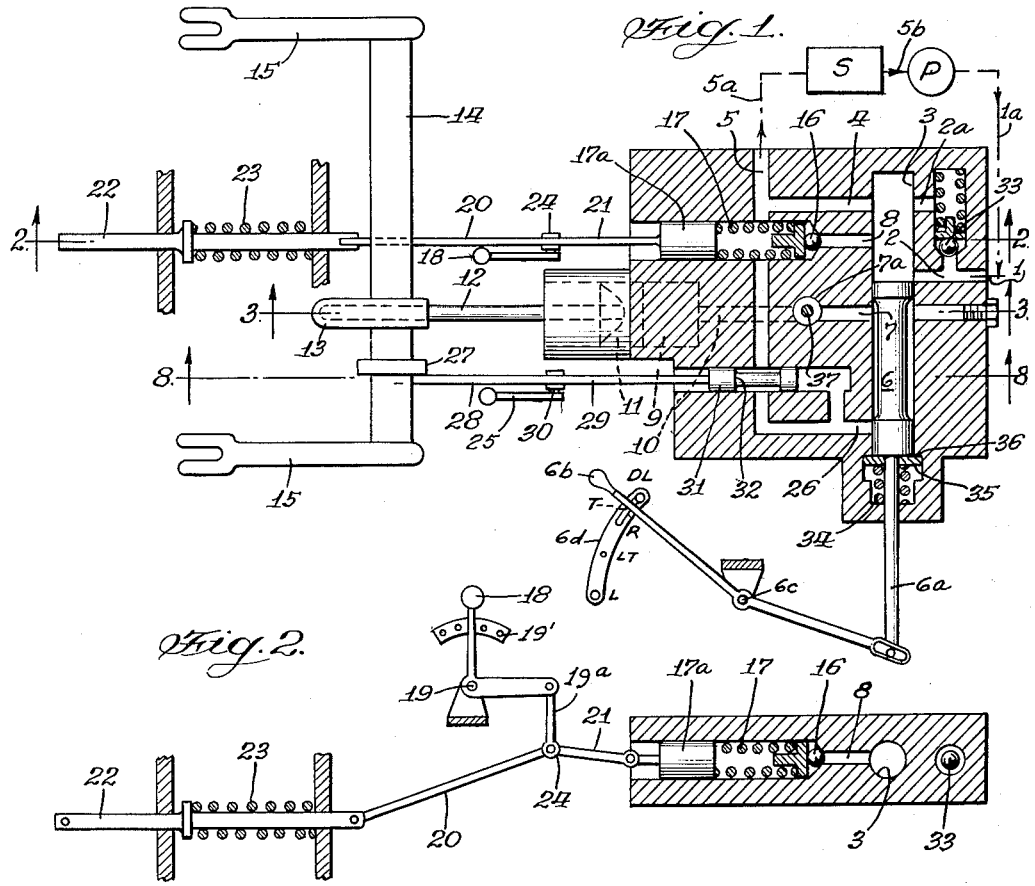

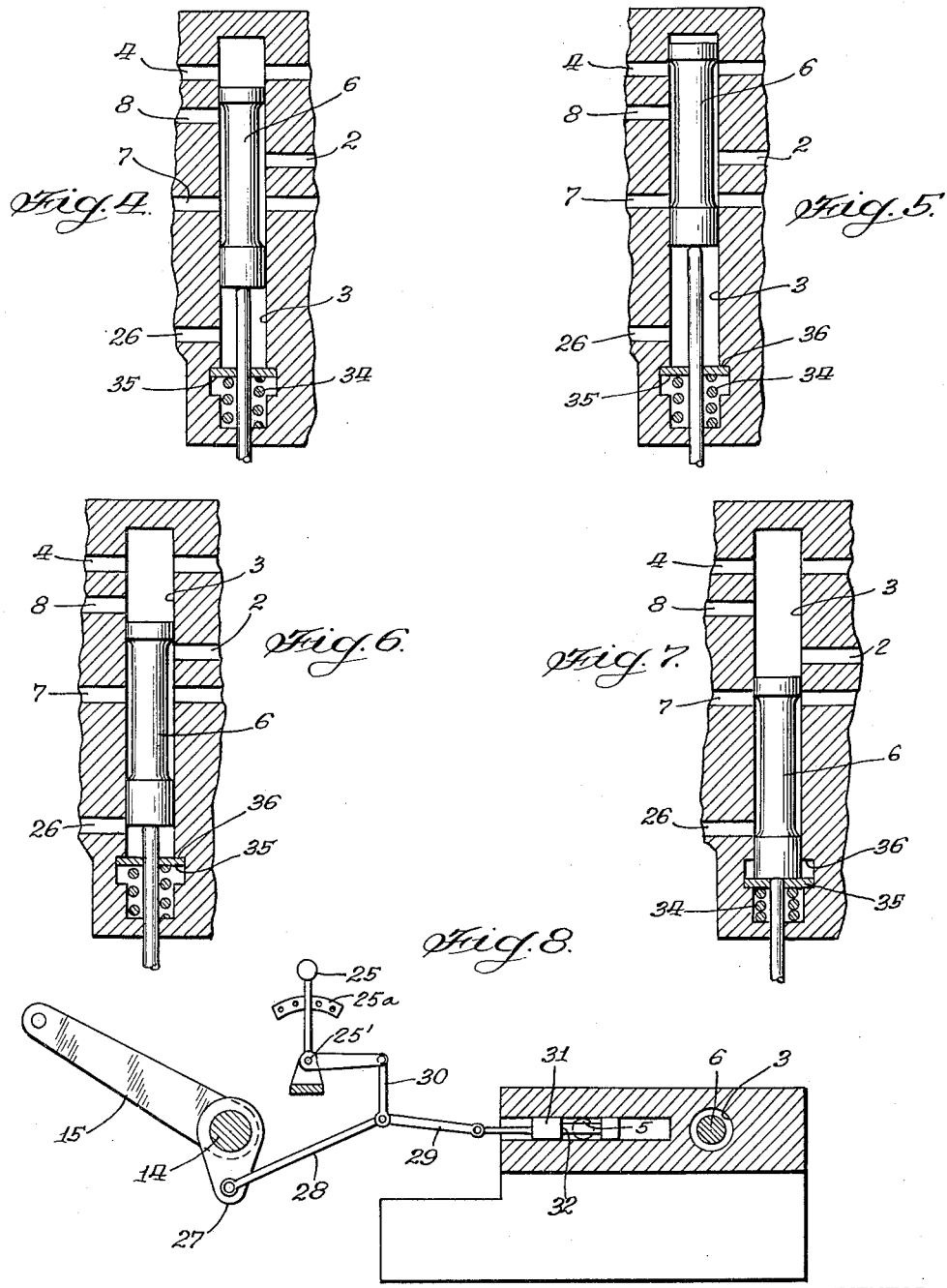

2,998,851
Patented Sept. 5, 1961

2,998,851
HYDRAULIC POWER LIFT CONTROL MEANS FOR TRACTORS
Robert Marindin, Doncaster, England, assignor to International Harvester Company, Chicago, Ill., a corporation of New Jersey
Filed Mar. 17, 1958, Ser. No. 722,001
Claims priority, application Great Britain Mar. 18, 1957
12 Claims. (Cl. 172—7)

This invention relates to hydraulic power lift control means for tractors, of the kind having implement-attaching means of the three-point linkage type, whereby optional load transfer in tractor implement assemblies may be obtained.

It is well-known that the tractive effort of a tractor, when used with plows and other agricultural implements imposing a substantial draft load, is limited by the incidence of slipping of the drive wheels of the tractor, particularly on soft ground, and that the tractive effort can be substantially increased within the limits of the available horse-power by increasing the loading on the drive wheels.

It is also known that if part of the weight of the implement can be transferred to the tractor, the required increased loading on the drive wheels of the tractor can be obtained without increasing the weight of the tractor itself as by the addition of wheel weights.

In tractor implement assemblies wherein the implement is connected to the tractor by a linkage of the three-point type, the usual hydraulic power lift acting on the linkage can be controlled so that a lifting force less than that required to raise the implement from its working position can be exerted, whereby part of the weight of the implement is transferred to the tractor for increasing the loading on the tractor drive wheels. Load transfer in this manner enables the available power of a tractor to be fully utilized so that a heavy and relatively expensive construction of tractor is unnecessary.

Systems involving control of the pressure in the hydraulic lift system by by-passing the hydraulic fluid at relatively high pressure through a relief valve are limited to operating pressure which will not involve undue overheating of the fluid due to the fluid being continuously forced through the restriction provided by the relief valve, and it has been found that, for this reason, control by a relief valve adjustably loaded according to variations in draft load, e.g. in response to movements of a draft-responsive member, is generally unsuitable for automatic depth or draft control of implements carried by a three-point linkage, and wherein the implement is supported at a selected working depth solely by applying an appropriate pressure in the hydraulic lift system.

Systems embodying a high pressure relief valve therefore are primarily applicable for effecting load transfer in tractor implement assemblies wherein the implement is supported at a desired working depth by means other than the hydraulic lift system, e.g. a depth-regulating wheel or skid, although they may be applied for depth or draft control when used with light implements, or implements of suitably limited draft, or wherein part of the load applied by the implement on the hydraulic lift is counter-balanced by other means so that the operating pressure is suitably limited.

It has before been proposed to provide a load transfer arrangement of the above character in which optional load transfer is obtainable by bringing into action a pre-set relief valve so that hydraulic fluid normally by-passed at low pressure is caused to build up a predetermined pressure in the hydraulic system less than that required to lift the implement from its working position.

If a relief valve set to a predetermined pressure is used for load transfer, and particularly if the pre-set pressure is relatively high, i.e. approaches closely that required to lift the implement, there may be a tendency for forward pitching movements of the tractor consequent on inequalities in ground level to lift the implement at times from its working position and thereby cause deviation from a constant working depth. Rearwardly pitching movement of the tractor may temporarily relieve the tractor of the normal transfer load so that intermittent wheel slip may occur.

It is therefore desirable to provide for a measure of compensation for fore and aft pitching movement of the tractor and also a means for increasing or decreasing the load transferred to increase or decrease an implement draft.

The present invention has for its object to provide improved control means for a hydraulic power lift of a tractor of a kind referred to, whereby load transfer may be more controllably applied so as to avoid the disadvantages referred to and, further, to provide simple and effective control means whereby the hydraulic lift system may be selectively conditioned for load transfer, free by-pass of pressure fluid in the hydraulic lift system when load transfer is not in use and implement supported at selected height, lifting and lowering.

According to the present invention, hydraulic power lift control means for a tractor of the type having implement-attaching means, e.g. of the three-point linkage type, operable by hydraulic power lift means and embodying a draft-responsive member resiliently loaded so as to be movable in response to changes in draft load, comprises a relief valve, means for adjusting the relief valve in response to changes in load on the draft-responsive member, and selector valve means controlling flow of hydraulic fluid under pressure from a source of supply and operable to direct the fluid under pressure either to a free, or substantially free, by-pass return passage, or both to the hydraulic lift and to the relief valve so that, in the latter case, the pressure applied to the hydraulic lift is dependent on the setting of the relief valve. The relief valve may be of the type in which a valve member, such as a ball, is held on its seating by a spring variably loaded in accordance with movements of the draft-responsive member.

Means may be provided for adjusting the setting of the relief valve relative to loading applied to the draft-responsive member. For example, the relief valve may be actuated by a movable member connected to the draft-responsive member through a toggle linkage operable by a manual control to vary the effective length of the connection between said movable member and the draft-responsive member.

The selector valve means may comprise a valve of the piston type controlling ports communicating with said source of supply, the by-pass return passage, the hydraulic power lift and the relief valve.

The selector valve means also may be selectively operable to direct fluid at full pressure from the source of supply to the hydraulic lift up to a limit provided by a pre-set relief valve for lifting an implement carried by the attaching linkage to which the power lift is connected, or to place the power lift cylinder in communication with a return passage to permit escape of fluid for lowering the implement.

The selector valve means also may be selectively operable to place the power lift in communication with a return passage controlled by auxiliary valve means responsive to movement of the power lift mechanism or linkage so as to shut off escape of fluid from the power lift when the implement falls to a position determined by the setting of the manual control for effecting adjustment of the auxiliary valve means in relation to the power lift mechanism or linkage. The auxiliary valve means may be connected to an arm on a cross-shaft of the power lift mechanism, or other suitable movable part thereof by means of a toggle linkage adjustable by the respective manual control means for varying the effective length of the connection between the auxiliary valve means and the movable part of the power lift mechanism or linkage.

By the improved control means according to the invention, an implement may be lifted from working to transport position and held in transport position, lowered to take up a working position determined, for example, by a depth-regulating wheel or skid on the implement, optional variable load transfer may be applied and the alternative depth-limiting control brought into operation, all by the operation of unitary selector valve means, the variable loading of the relief valve and the depth-limiting control being adjustable by separate manual controls.

The invention is hereinafter described, by way of example, with reference to the diagrammatic drawings in which:

FIG. 1 is a sectional plan view illustrating one embodiment of hydraulic power lift control means according to the invention, the selector valve being shown in the position in which the power lift is holding the implement in a raised position.

FIG. 2 is a vertical section on the line 2—2, FIG. 1;

FIG. 4 is a vertical section on the line 3—3, FIG. 1;

FIG. 4 is a fragmentary sectional plan view of the valve unit shown in FIG. 1 with the selector valve thereof shown in the load transfer position;

FIG. 5 is a view similar to FIG. 4 with the selector valve in the implement-lowering position;

FIG. 6 is a view similar to FIG. 4 showing the valve 6 in the lifting position;

FIG. 7 is a view similar to FIG. 4 showing the valve 6 in the depth-limiting position; and FIG. 8 is a vertical section on the line 8—8, FIG. 1.

In carrying the invention into effect according to one embodiment, and with reference to the drawings, control means for a power lift may comprise a unit or assemblage adapted for mounting on a tractor and integrally or otherwise associated with the ram cylinder of the power lift. Referring particularly to FIGS. 1, 2 and 3, hydraulic fluid delivered by fluid-conducting means 1a from a pump P enters the control means at 1 and flows into a passage 2 communicating with a bore 3. A manually operated selector valve 6 of the piston type is slidably positionable in the bore or chamber 3 to control flow of fluid between various passages. The valve 6 has a stem 6a which is attached to a manually operated bell crank lever 6b pivotally attached to the tractor rear housing (not shown) at 6c, said lever 6b being held in various positions in notches on the detent member or quadrant 6d which is also affixed to the tractor rear housing. A passage 4 communicates through the bore 3 with a by-pass return passage 5 communicating by fluid-conducting means 5a with a reservoir S, in turn, communicating by the fluid-conducting means 5b with pump P. A passage 7 extends from the bore 3 and communicates through a vertical bore 7a and passage 10 with the ram cylinder 9 of the power lift. A passage 8 intermediate the passages 4 and 7 leads from the bore 3 to a relief valve 16, and a passage 26 extends from the bore 3 and communicates with the passage 5 under the control of an auxiliary piston valve 31. The inlet passage 2 also communicates by passage 2a with the bore 3 at a position opposite the passage 4 through a preset relief valve 33 serving to restrict the maximum pressure in the system.

The relief valve 16 is pressed against its seating by a spring 17, the loading of which is variable by means of a slidable member 17a connected by a toggle linkage 20, 21 to a draft-responsive member 22 to which the top link of a three-point linkage is connected, the member 22 being movable, under the influence of changes in compressive load on the top link, against the action of a spring 23. The toggle linkage is adjustable by a manual control bell crank lever 18 pivotally connected to the tractor rear housing at 19 and slidable over an arcuate detent member 19' also attached to the tractor rear housing and connected to the common pivot 24 of the toggle links 20, 21 through a link 19a so that the effective length of the connection between the member 17a and the member 22 may be varied to adjust the relation between loading on the spring 17 and the position of the draft-responsive member 22.

The ram piston operating in the ram cylinder 9 acts through a push-rod 12 on an arm 13 on a cross-shaft or rock shaft 14 provided with lift arms 15 which are connected by lift links (not shown) to the lower links of a three-point implement-attaching linkage.

The auxiliary piston valve 31 is connected through toggle links 28, 29 with a drop arm 27 on the cross-shaft 14 and this toggle linkage is adjustable by means of a manual control bell crank lever 25 pivotally connected to the tractor rear housing at 25' and slidable over an arcuate detent member or quadrant 25a also attached to the tractor rear housing and connected through a link 30 to the common pivot of the links 28, 29 so that the effective length of the connection between the auxiliary piston valve 31 and the arm 27 may be varied. An adjustable restrictor valve 37 may be provided in the passage 7a for regulating the flow of oil to or from the cylinder 9.

The piston selector valve 6 is normally maintained, by back pressure in the system, in the position shown in FIG. 1 with one end of the valve seating against a face 36 of a washer 35 displaceable to a limited extent against the action of a spring 34.

In the position shown in FIGS. 1, 2 and 3 wherein the lever 6b is in position T on the quandrant 6d (see FIG. 1), the power lift mechanism is in the implement-raised position and as return flow of fluid from the passage 7 is prevented by the piston valve 6, the lift mechanism is held in the elevated position. The hydraulic fluid delivered from the pump P can pass through the passage 2, bore 3 and passage 4 to the by-pass return passage 5 and thus flow back to the oil reservoir with negligible obstruction to flow.

For lowering the implement to working position determined, for example, by a depth-regulating wheel or skid on the implement, the selector valve 6 is moved to the extremity of its travel away from the washer 35 to the position shown in FIG. 5 wherein the lever 6b is in position L on quadrant 6d (see FIGURE 1), so that the intermediate reduced portion of the piston straddles the passages 2, 4 and 7 to enable fluid to flow out from the cylinder 9 through the passage 7, bore 3, and passage 4 to the by-pass return passage 5, while at the same time, fluid delivered through the passage 2 also flows through the bore 3 and passage 4 to the passage 5.

When the implement is in working position, tractive pull which can be exerted by the tractor can be increased by applying load transfer, i.e. by actuating the hydraulic lift so that a lifting force less than that required to lift the implement from working position is applied with consequent transfer of load to the rear driving wheels of the tractor. Application of load transfer is accomplished by positioning the piston valve 6 as shown in FIG. 4 wherein lever 6b is in position LT on quadrant 6d (see FIG. 1), so that the reduced portion of the valve places the passages 2, 7 and 8 in communication with one another. As the fluid delivered under pressure to the passage 2 can now only flow to the by-pass return passage 5 through the relief valve 16, the pressure applied in the ram cylinder 9 is governed by the loading applied through the spring 17 to the relief valve 16. As before described, the loading on the relief valve 16 is adjustable by operation of the control lever 18. When used with implements of considerable draft supported at a predetermined working depth by a depth control wheel or skid, the arrangement is such that the maximum loading on the relief valve is restricted to exert a maximum pressure in the ram cylinder 9 less than that required to lift the implement from working position.

Variable loading of the relief valve 16 in the manner described in response to movement of the draft-responsive member 22 serves to adjust the pressure in the ram cylinder 9 to provide a measure of compensation for fluctuations introduced by fore and aft pitching of the tractor in relation to the implement due to irregularities of ground level. If the tractor pitches forward there will be a tendency to lift the implement from its working position, particularly if maximum load transfer is being employed. However, on forward pitching movement of the tractor, any reduction or reversal in load on the draft-responsive member 22 reduces the loading on the relief valve 16 and consequently the pressure in the ram cylinder 9, thereby reducing the lifting action on the implement. Rearward pitching of the tractor and consequent upward movement of the lift arms 15 in relation to the tractor tends momentarily to relieve the tractor of the normal transfer load, but the increased compressive load exerted on the draft-responsive member 22 acts to increase the loading on the relief valve 16 and consequently the pressure in the ram cylinder 9 so as to increase lift and consequent load transfer and avoid the possibility of intermittent wheel slip.

In practice, the maximum loading on the relief valve 16 is determined by the necessity of limiting the operating pressure so that continuous by-passing of fluid through the relief valve will not involve undue overheating of the fluid, and the invention is therefore primarily applicable for obtaining load transfer when used with wheel or skid-supported implements. However, in the case of implements of light weight or draft, or implements in which a suitable proportion of the weight is counter-balanced by other means, the control means may be used for automatic depth or draft control for maintaining a substantially constant working depth or draft of an implement which is not supported by a depth-regulating wheel or skid.

When it is required to raise the implement to transport position, the selector valve 6 is positioned, as shown in FIG. 6 wherein lever 6b is in position R on quadrant 6d (see FIG. 1), so as to straddle only the passages 2 and 7, whereupon the full pressure from the source of supply is applied in the ram cylinder 9 to lift the implement. At the upper limit of travel of the lifting mechanism, build-up of pressure will cause the relief valve 33 to open so that the fluid will commence to flow back to the reservoir through the passages 2a, 4, and 5. The back pressure in the bore 3 will then act to return the selector valve 6 to the position shown in FIG. 1 wherein lever 6b is in position T on quadrant 6d (see FIGURE 1).

When using an implement of little or no draft, it may be necessary to limit the amount of its fall towards the ground to a definite distance. In such cases, load transfer is not required and the alternative depth-limiting control shown in FIGS. 1 and 8 is brought into action by displacing the selector valve 6 from the position shown in FIG. 1 against the action of the spring 34, to the position shown in FIG. 7 in which the passages 7 and 26 are placed in communication. Hydraulic fluid then flows from the cylinder 9 through the passages 10, 7a, 7, bore 3 and passage 26 to the return passage 5, thus allowing the lift arms 15 to fall. At the same time the movement of the arm 27 on the cross-shaft 14 acting through the toggle links 28, 29 causes the auxiliary piston valve 31 to move to the right and, when the face 32 of the valve 31 shuts off communication between the passages 26 and 5, return flow of fluid from the ram cylinder 9 is cut off so that falling movement of the implement is arrested at a point determined by the setting of the control lever 25 which, by varying the effective length of the connection between the valve 31 and the arm 27, adjusts the point in the lowering movement of the lift arms 15 at which cut-off occurs.

It will be understood that the invention is not limited to the particular embodiment hereinbefore described.

I claim:

1. In a tractor having an implement hitch means adapted to carry an implement and including a draft responsive member resiliently loaded so as to be movable in response to changes in draft load, hydraulic power lift means including a ram cylinder and a ram piston reciprocal within said cylinder, and a pump and a reservoir containing a fluid; a hydraulic power lift control means having a chamber with an inlet passage in communication with said pump and a by-pass return passage in communication with said reservoir and a conduit in communication with said cylinder, a manually operated selector valve reciprocal within said chamber, a relief valve means operatively connected with said draft responsive member and retained thereby and in communication with said chamber and said by-pass return passage and operable to intermittently dispel fluid to the reservoir in accordance with movement of the draft responsive member, a pre-set relief valve in communication with said inlet passage and said chamber, and a depth limiting valve means in communication with said chamber and said by-pass return passage and connected to the power lift means, said selector valve being movable into a first position permitting communication between said inlet passage and said conduit and said by-pass return passage for lowering said implement, and into a second position permitting communication between said inlet passage and said conduit and said relief valve means for adjusting the position of the implement consequent upon draft forces exerted upon said draft responsive member, and into a third position permitting communication between said inlet passage and said conduit for raising said implement, and into a fourth position permitting communication between said inlet passage and said by-pass return passage consequent upon unseating of said preset relief valve for transport of said implement, and into a fifth position permitting communication between said conduit and said depth limiting piston valve means and said by-pass return passage for lowering of said implement whereupon movement of said depth limiting piston valve means terminates communication between said chamber and said by-pass return passage to prevent a further descent of the implement.

2. In a tractor having an implement hitch means adapted to carry an implement and including a draft responsive member resiliently loaded so as to be movable in response to changes in draft load, hydraulic power lift means including a ram cylinder and a ram piston reciprocal within said cylinder, and a pump delivering fluid under pressure and a reservoir as a source of fluid; a hydraulic power lift control means having a chamber with an inlet passage in communication with said pump and a by-pass return passage in communication with said reservoir and a conduit in communication with said cylinder, a manually operated selector valve reciprocal within said chamber, a relief valve means operatively connected with said draft responsive member and in communication with said chamber and said by-pass return passage and operable to intermittently dispel fluid to the reservoir in accordance with the movement of the draft responsive member, and a depth limiting valve means in communication with said chamber and said by-pass return passage and connected to the power lift means, said selector valve being movable into a first position permitting communication between said inlet passage and said conduit and said by-pass return passage for lowering said implement, and into a second position permitting communication between said inlet passage and said conduit and said relief valve means for adjusting the position of the implement consequent upon draft forces exerted upon said draft responsive member, and into a third position permitting communication between said inlet passage and said conduit for raising said implement, and into a fourth position permitting communication between said inlet passage and said by-pass return passage for transport of said implement, and into a fifth position permitting communication between said conduit and said depth limiting piston valve means and said by-pass return passage for lowering of said implement whereupon movement of said depth limiting piston valve means terminates communication between said chamber and said by-pass return passage to prevent a further descent of the implement.

3. In a tractor having an implement hitch means adapted to carry an implement and including a draft responsive member resiliently loaded so as to be movable in response to changes in draft load, a hydraulic power lift means including a ram cylinder and associated ram piston and a pump delivering fluid under pressure and a reservoir as a source of fluid, a power lift control means having a chamber communicable with said pump and said reservoir and said cylinder, a selector valve movable within said chamber, a relief valve means operatively connected with said draft responsive member and communicating with said chamber and said reservoir and operable to intermittently dispel fluid to the reservoir in accordance with the movement of the draft responsive member, a preset-relief valve in communication with said pump and said chamber, and a depth limiting valve means communicating with said chamber and said reservoir and connected to the power lift means, said selector valve being movable into a first position permitting communication between the pump and the cylinder and the reservoir for lowering the implement, and into a second position permitting communication between the pump and the cylinder and the relief valve means for adjusting the position of the implement consequent upon draft forces exerted upon said draft responsive member, and into a third position permitting communication between the pump and the cylinder for raising the implement, and into a fourth position permitting communication between the pump and the reservoir consequent upon unseating the pre-set relief valve for transport of said implement, and into a fifth position permitting communication between the cylinder and the depth limiting valve means and the reservoir for lowering the implement whereupon movement of said depth limiting valve means terminates communication between the chamber and the reservoir to prevent further descent of the implement.

4. In a tractor having an implement hitch means adapted to carry an implement and including a draft responsive member resiliently loaded so as to be movable in response to changes in draft load, a hydraulic power lift means including a ram cylinder and associated ram piston and a pump delivering fluid under pressure and a reservoir as a source of fluid; a power lift means control means having a chamber communicable with said pump and said reservoir and said cylinder, a selector valve movable within said chamber, a relief valve means operatively connected with said draft responsive member and communicating with said chamber and said reservoir and operable to intermittently dispel fluid to the reservoir in accordance with the movement of the draft responsive member, and a depth limiting valve means communicating with said chamber and said reservoir and connected to the power lift means, said selector valve being movable into a first position permitting communication between the pump and the cylinder and the reservoir for lowering the implement, and into a second position permitting communication between the pump and the cylinder and the relief valve means for adjusting the position of the implement consequent upon draft forces exerted upon said draft responsive member, and into a third position permitting communication between the pump and the reservoir for transport of said implement, and into a fourth position permitting communication between the cylinder and the depth limiting valve means and the reservoir for lowering of the implement whereupon movement of said depth limiting valve means terminates communication between the chamber and the reservoir to prevent further descent of the implement.

5. In a tractor having an implement hitch means adapted to carry an implement and including a draft responsive member resiliently loaded so as to be movable in response to changes in draft load, a hydraulic power lift means including a ram cylinder and associated ram piston and a pump delivering fluid under pressure and a reservoir as a source of fluid; a hydraulic power lift control means having a chamber having ports communicating with the pump, with the cylinder and the reservoir, a relief valve means operatively connected with said draft responsive member and having ports communicating with the chamber and the reservoir, manually controlled means operable to intermittently dispel fluid to the reservoir in accordance with movement of the draft responsive member and disposed within the chamber placing the ports to the pump, cylinder and reservoir in fluid communication with one another for lowering the implement and placing the ports to the pump and cylinder in communication with one another the relief valve for adjusting the position of the implement consequent upon draft forces exerted upon said draft responsive means and placing the ports to the pump and the cylinder in fluid communication with one another for raising the implement and placing the ports to the pump and the reservoir in communication with one another for transport of the implement allowing the relief valve to be seated.

6. The invention according to claim 5 and said relief valve means comprising a ball valve and a spring resiliently loaded and seating said ball valve in accordance with movements of the draft responsive member.

7. The invention according to claim 5 and said relief valve means is provided with means for adjusting the setting thereof relative to the loading applied to the draft responsive member.

8. The invention according to claim 5 and said relief valve having a movable member connected to the draft responsive member, a toggle linkage connected to said movable member, a manual control connected to said toggle linkage to vary the combined effective length of the movable member and the draft-responsive member for adjusting the relief valve.

9. The invention according to claim 5 and said means disposed within the chamber comprising a piston valve reciprocally positionable within said chamber for controlling communication of the fluid under pressure from the pump with the cylinder and by way of the relief valve means to the reservoir and to the reservoir without unseating the relief valve means.

10. The invention according to claim 5 and said control means having a pre-set relief valve and by-pass return passage communicating with said reservoir, said means disposed within the chamber comprising a selector valve, said selector valve being selectively operable to direct fluid at full pressure from the pump to the power lift means up to a limit provided by said pre-set valve for lifting an implement and to place the cylinder in communication with said return passage to permit escape of fluid for lowering the implement.

11. The invention according to claim 5 and said control means having a depth limiting valve means in communication with the chamber and the reservoir and having a manual control operatively connected to the power lift means, wherein the means disposed with the chamber is selectively operable to place the cylinder in communication with the reservoir controlled by the depth limiting valve means responsive to movement of the power lift means shutting off escape of fluid from the cylinder when the implement falls to a position determined by the setting of the manual control.

12. The invention according to claim 11 and said power lift means having an arm and a toggle linkage connected to said arm and the manual control and the depth limiting valve means, said toggle linkage being adjustable by the manual control for varying the combined effective length of the depth limiting valve means and the arm.

References Cited in the file of this patent

UNITED STATES PATENTS

| | | |
|---|---|---|
| 2,611,306 | Strehlow | Sept. 23, 1952 |
| 2,611,307 | Strehlow | Sept. 23, 1952 |
| 2,689,513 | Ferguson | Sept. 21, 1954 |
| 2,722,873 | Germager | Nov. 8, 1955 |
| 2,750,862 | Germager | June 19, 1956 |
| 2,764,923 | Morgen | Oct. 2, 1956 |
| 2,851,938 | Giertz | Sept. 16, 1958 |
| 2,871,963 | Harris et al. | Feb. 3, 1959 |

FOREIGN PATENTS

| | | |
|---|---|---|
| 1,075,023 | France | Apr. 7, 1954 |
| 728,858 | Great Britain | Apr. 27, 1955 |